United States Patent Office 2,822,461
Patented Feb. 4, 1958

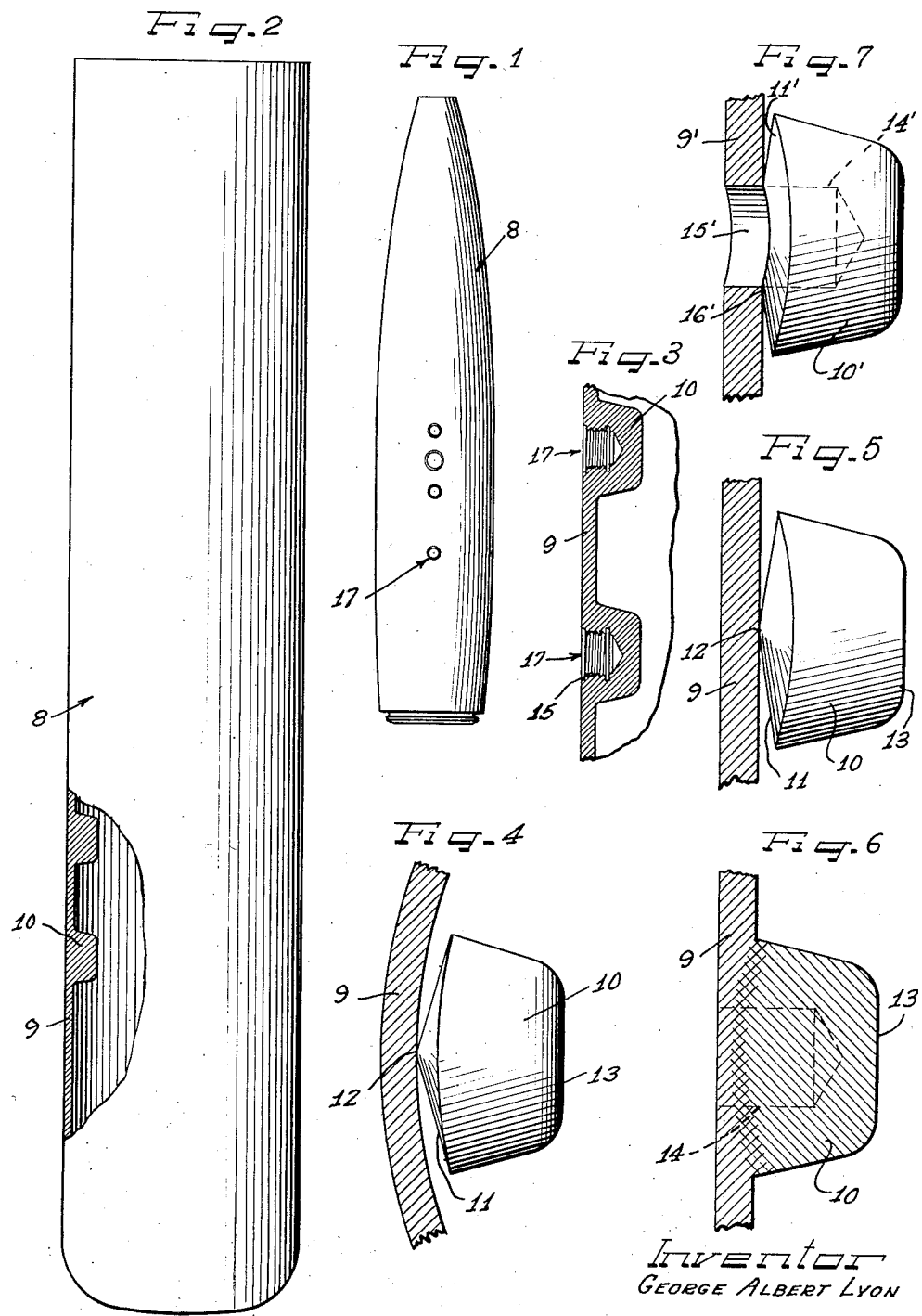

2,822,461

BOMB HANGER SOCKET AND METHOD OF MAKING SAME

George Albert Lyon, Detroit, Mich.

Application February 18, 1955, Serial No. 489,166

13 Claims. (Cl. 219—93)

The present invention pertains to a novelly welded stud construction and more particularly to a hanger socket for a cylindrical object such as a bomb whereby the bomb may be suspended from the underside of an airplane.

An object of this invention is to provide a simple, efficient and economical way of attaching a metal socket stud to the inner curved surface of a cylindrical metal wall such as a bomb or the like.

Another object of this invention is to provide a novel metal socket stud construction for attachment to an inner cylindrical surface of a metal wall and which lends itself for attachment to the metal wall by projection welding with a minimum of flash.

Still another object of the invention is to provide a metal socket stud which may be snugly nested against the curved inner surface of a cylindrical metal wall for easy attachment to the metal wall by a simple projection welding operation.

Another and still further object of the invention is to provide a novel method of attaching a metal socket stud to the inner curved surface of a cylindrical hollow metal wall.

A further object of this invention is to provide means for facilitating the welding of two metal surfaces in order to provide a perfect seal between the metal surfaces.

In accordance with the general features of this invention, there is provided in a metal stud structure for projection from an interior curved surface of a generally cylindrical metal wall, a metal stud having an end to be welded to the metal wall and which end is irregularly curved about a given central point and of such configuration as to have snug nested engagement against the curved inner surface of the generally cylindrical metal wall when projected against the metal wall and subjected to pressure during a projection welding operation.

Another feature of the invention relates to the provision of a novel method of welding a stud to the inner curved surface of a cylindrical metal wall and which includes the steps of forming an end of the metal stud with an irregular curvature about a given central point disposed at the axis of the metal stud and which curvature is of such configuration as to nest snugly against the inner curved surface of the generally cylindrical metal wall, pressing said end of the metal stud endwise tightly against the surface of the metal wall and while in such engagement projection welding the end of the metal stud to the wall to unite uniformly the metal of the stud with that of the metal wall and to tightly seat the curved surface in welded cooperation with the metal wall.

Other objects and features of this invention may more fully appear from the following detailed description taken in connection with the accompanying drawings which illustrate a single embodiment thereof and in which—

Figure 1 is a side elevation of a bomb structure having a cylindrical hollow metal wall;

Figure 2 is an enlargement of a portion of the wall partly broken away showing how the hanger studs project into the interior of the bomb;

Figure 3 is a fragmentary vertical sectional view drawn to an enlarged scale corresponding to the broken away portion of Figure 2 but illustrating the sockets in section;

Figure 4 is a fragmentary diagrammatic plan view partly in section illustrating how a metal stud with a novelly formed curved end is positioned against the inner curved surface of the cylindrical metal wall prior to welding;

Figure 5 is a view similar to Figure 4 but taken at right angles to the showing in Figure 4 illustrating the construction of the curved end of the metal stud in the direction of the length of the cylindrical metal wall;

Figure 6 is a fragmentary view similar to Figure 5 but in section and showing diagrammatically how the metal stud is joined to the metal wall after being welded thereto by a projection weld; and Figure 7 is a fragmentary view similar to Figure 5 but showing how the metal wall and the metal stud may be initially drilled if it is so desired prior to the welding operation for providing a socket in the metal stud.

As shown on the drawings:

The reference numeral 8 in Figure 1 indicates generally a metal or steel bomb casing before the war head, powder and tail fins have been assembled therewith.

Figure 2 shows the bomb casing 8 as having a generally cylindrical metal wall 9. Secured to and projecting inwardly of the cylindrical metal wall 9 internally of the bomb casing are my novel metal studs 10 which may be of any suitable number requisite for the hanging of the bomb.

In order to grasp fully the import of my invention it is important to note that one of the most pressing problems in bomb construction is to provide a simple means by which a bomb such as herein illustrated may be suspended from the wing of an airplane or the like. This means must meet predetermined international requirements both as to strength and construction.

One of the principal features of my novel construction is that each metal stud 10 lies wholly internally of the cylindrical wall so that the bomb casing will be completely streamlined.

Each stud 10, as best seen in Figures 4, 5 and 6, is comprised of a solid piece of steel and is generally frusto-conical in shape. One end 11 of the stud 10 is sloped and terminates in a peak 12. The other end 13 of the stud 10 is flat.

The sloped end 11 has an irregular curvature of a predetermined configuration which is based as a general proposition upon the curvature of the metal wall 9 to which the stud is to be secured.

In determining the curvature to be imparted to the stud end 11 it will be noted that the longitudinal and transverse curvature of the cylindrical metal wall 9 of the bomb cylinder 8 varies. In other words, the angles of declination of the longitudinal and transverse curvatures are different.

It is a well known fact in stud welding procedures that the stud end should be preformed to size in order to meet certain standard requirements or else the flash in the welding operation will be accentuated along with a general weakening of the bond between the metal surfaces after welding. This of course, is extremely undesirable especially when the studs are employed as bomb hangers.

Heretofore the curvature of the stud ends has not been so formed as to compensate for both longitudinal and transverse variations in the angles of declination.

It is therefore an object of my invention to make a stud end which will more closely approximate in configuration the irregular shape of the surface to which the stud end is to be welded.

Figures 4 and 5 show the angle of declination of the stud end in relation to the cylindrical wall from different view points at right angles to each other, thus highlighting the varying angular configuration which, however, is in circular form about a given central point in the axis of the stud. This will serve to illustrate how the stud end must be irregularly shaped if it is to nest snugly against the inner cylindrical surface.

The stud 10 may be affixed to the wall 9 by means of placing electrodes on the end 13 of the stud and on the outside of the cylindrical wall 9 and subjecting the stud and wall to a predetermined pressure while passing current through the electrodes. Any suitable resistance welding structure (not shown), may be employed for this purpose. It should be noted that the varying angle of the irregularly shaped stud end 11 facilitates escape of flash incident to welding.

Thereafter the wall 9 and the stud 10 may be drilled at 14 as shown by the dotted lines in Figure 6 and tapped as shown at 15 in Figure 3 in order to form a socket 17 to receive threadingly a conventional drop ring (not shown) or the like such as is now utilized to maintain the bomb on the underside of the plane wing.

In the method of attaching the stud 10 to the inner surface of the cylindrical wall 9 the stud end is first preformed in an irregular manner so as to approximate closely the configuration of the cylindrical wall 9 so that the two may be nested. The stud is then inserted within the bomb casing and the stud end is pressed against the internal surface of cylindrical wall 9. Electric current is then passed through the electrodes (not shown), bearing upon the wall 9 and the stud end 13 and in this manner tightly and uniformly seating and securing the curved stud end 11 in welded cooperation with the metal wall.

It is in this manner that an excellent and uniform seal is formed which precludes any possibility of moisture seeping through into the bomb powder after the bomb is assembled.

Figure 7 shows a modified form of a metal stud 10′ in which the stud end 11′ has been drilled prior to the welding operation in order to form an aperture 14′. This is also true of the cylindrical wall 9′ in that it has been previously drilled in order to form an aperture 15′. In this form of the invention there is no apex or peak on the stud end as on the other embodiment, rather, the stud end terminates in a generally annular edge 16′. It will be appreciated that the two embodiments are otherwise the same especially in regard to the irregular curvature of the stud end previously described.

Relative to the method of attaching the stud to the wall in the modified form the principal difference resides in that the respective apertures of the stud and cylindrical wall must be aligned prior to the welding operation. After the welding operation the aligned apertures will be tapped thus completing the socket.

In Figure 1 there is shown four stud sockets 17 formed in the cylindrical wall and the respective studs. It will be appreciated that more than one stud may be simultaneously welded to the cylindrical wall if so desired.

If desired, in order to obtain uniform build-up of the weld the studs may be made of a higher heat resistant metal or steel in order to facilitate proper fusion of the metals.

It will be understood that modifications and variations may be effected without departing from the scope of the novel concepts of the present invention.

I claim as my invention:

1. In a metal stud structure for projection from an interior curved surface of a generally cylindrical metal bomb casing wall, a metal stud having an end to be welded to the curved surface of the metal wall and which end has a tapered surface irregularly and substantially smoothly curved about a given central point with the irregular substantially smoothly curved tapered surface being such as to more readily afford clearance for the elimination of flash incident to the metal stud being fused to and engulfed in the metal wall and such as to reduce the duration of the welding operation by virtue of the relatively matched relationship between the irregularly smoothly curved tapered stud surface and the curved surface of the cylindrical metal wall thereby reducing the possibility that the exterior surface of the casing wall will be marred.

2. In a metal stud structure for projection from an interior curved surface of a generally cylindrical metal bomb casing wall, a metal stud having an end to be welded to the curved surface of the metal wall and which end has a tapered surface irregularly and substantially smoothly curved about a given central point with the irregular substantially smoothly curved tapered surface being such as to more readily afford clearance for the elimination of flash incident to the metal stud being fused to and engulfed in the metal wall and such as to reduce the duration of the welding operation by virtue of the relatively matched relationship between the irregularly smoothly curved tapered stud surface and the curved surface of the cylindrical metal wall thereby reducing the possibility that the exterior surface of the casing wall will be marred, said stud having a flat bottom and an annular side wall tapered from the bottom away from said end.

3. In a metal stud structure for projection from an interior curved surface of a generally cylindrical metal bomb casing wall, a metal stud having an end to be welded to the curved surface of the metal wall and which end has a tapered surface irregularly and substantially smoothly curved about a given central point with the irregular substantially smoothly curved tapered surface being such as to more readily afford clearance for the elimination of flash incident to the metal stud being fused to and engulfed in the metal wall and such as to reduce the duration of the welding operation by virtue of the relatively matched relationship between the irregularly smoothly curved tapered stud surface and the curved surface of the cylindrical metal wall thereby reducing the possibility that the exterior surface of the casing wall will be marred, said stud having a centrally recessed area only opening outwardly of the end and being defined at its outer margin by an edge also irregularly curved about the central point.

4. In a metal stud structure for projection from an interior curved surface of a generally cylindrical metal wall, a metal stud having an end to be welded to the metal wall and which end is irregularly curved about and sloped toward a given central point and of such configuration as to have snug nested engagement against the curved inner surface of the generally cylindrical metal wall when projected against the metal wall and subjected to pressure during a projection welding operation, said irregularly curved end being of such configuration before welding that the angle of the curving sloped end relative to a given plane passing through the given central point parallel to the longitudinal axis of said generally cylindrical metal wall is substantially greater when viewed from one position as opposed to the angle seen when the stud is viewed from a position generally at right angles to said position.

5. In a metal stud structure for projection from an interior curved surface of a generally cylindrical metal wall, a metal stud having an end to be welded to the metal wall and which end is irregularly curved about and sloped toward a given central point and of such configuration as to have snug nested engagement against the curved inner surface of the generally cylindrical metal wall when projected against the metal wall and subjected to pressure during a projection welding operation, said metal stud having a recessed portion open at only one end and said metal wall having a hole therethrough in axial alignment with said recessed portion and said hole, said recessed portion centered on said point in alignment with the hole through the wall while being welded and after being welded together defining a socket accessible only from the exterior of said cylindrical wall, at least said recessed portion being threaded so that when an extension is in threaded assembly the bond between said stud and casing wall is augmented, said irregularly curved end being of such configuration before welding that the angle of the curving sloped end relative to a given plane passing through the given central point parallel to the longitudinal axis of said generally cylindrical metal wall is substantially greater when viewed from one position as opposed to the angle seen when the stud is viewed from a position generally at right angles to said position.

6. In a method of attaching a metal stud to the inner curved surface of a generally cylindrical hollow metal wall, the steps of forming an end of the metal stud with an irregular curvature about a given central point disposed at the axis of the metal stud and which curvature is of such configuration as to approximate the configuration of the inner curved surface facilitating nesting snugly against the inner curved surface of the generally cylindrical metal wall, pressing said end of the metal stud endwise tightly against said surface of the metal wall and while in such engagement projection welding said end of the metal stud to the wall to unite uniformly the metal of the stud with that of the metal wall and to tightly seat said curved surface in welded cooperation with the metal wall.

7. In a method of attaching a metal stud to the inner curved surface of a generally cylindrical hollow metal wall, the steps of forming an end of the metal stud with an irregular curvature about a given central point disposed at the axis of the metal stud and which curvature is of such configuration as to nest snugly against the inner curved surface of the generally cylindrical metal wall, pressing said end of the metal stud endwise tightly against said surface of the metal wall and while in such engagement projection welding said end of the metal stud to the wall to unite uniformly the metal of the stud with that of the metal wall and to tightly seat said curved surface in welded cooperation with the metal wall and during the welding operation utilizing said curved surface to afford clearance for facilitating elimination of flash incident to the metal stud being fused to and engulfed in the metal wall.

8. In a bomb casing assembly including a metal stud for projection from an interior curved surface of an apertured generally cylindrical metal casing wall, the improvement of said metal stud having an apertured sloped end to be welded to the metal wall and which sloped end is irregularly curved and of such configuration as to be in snug nested engagement against the inner surface of the generally cylindrical metal wall when the apertured stud end is aligned with and projected against the apertured metal wall during a resistance welding operation, said apertured stud end terminating in a continuous generally annular irregularly curved edge centered about the axis of the aligned apertures.

9. In a method of attaching a centrally recessed metal stud to the inner curved surface of a generally cylindrical apertured metal wall, the steps of forming an end of the apertured metal stud with an irregular annular curvature about said centrally disposed recess of the metal stud and which curvature is of such configuration as to be snugly nestable against the inner curved surface of the generally cylindrical apertured metal wall, aligning the aperture and the recess and pressing said curved end of the metal stud endwise against said surface of the metal wall and while in such engagement resistance welding said end of the metal stud to unite and seal the stud with the metal wall in an annular area about the axis of the aligned recess and aperture and during the welding operation utilizing the curved surface to afford clearance for facilitating elimination of flash incident to the metal stud being fused to and engulfed in the metal wall thereby providing an outwardly opening hanger socket.

10. In a bomb casing assembly having a casing provided with a metal wall with an interior curved surface, the improvement of a metal stud having an end to be welded to the metal wall and which end is irregularly curved about and sloped toward a given central point and of a configuration to nestingly and snugly engage against the interior curved surface of the metal wall as said end and curved surface are welded together, said metal stud and metal wall having aligned recesses defining a socket accessible from the exterior of the metal wall, said socket being threaded to threadingly receive a portion of a drop ring, said irregularly curved end being of such configuration before welding that the angle of the curved sloped end relative to a given plane passing through the given central point parallel to the longitudinal axis of said casing is substantially greater when viewed from one position as opposed to the angle seen when the stud is viewed from a position generally at right angles to said position.

11. In a metal stud structure for projection from an interior curved surface of a generally cylindrical metal wall, a metal stud having an end to be welded to the metal wall and which end is irregularly curved about and sloped toward a given central point and of such configuration as to lend itself to snug nested engagement against the curved inner surface of the generally cylindrical metal wall when projected against the metal wall and subjected to pressure during a projection welding operation, said metal stud having a recessed portion open at only one end and said metal wall having a hole therethrough in axial alignment with said recessed portion and said hole, said recessed portion and said hole axially of the point defining a socket accessible only from the exterior of said cylindrical metal wall, at least said recessed portion being threaded so that when an extension is in threaded assembly the bond between said stud and casing wall is augmented, said irregularly curved end being of such configuration before welding that the angle of the curving sloped end relative to a given plane passing through the given central point parallel to the longitudinal axis of said generally cylindrical metal wall is substantially greater when viewed from one position as opposed to the angle seen when the stud is viewed from a position generally at right angles to said position.

12. In a metal stud structure for projection from an interior curved surface of a generally cylindrical metal wall, a metal stud having an end to be welded to the metal wall and which end is irregularly curved about and sloped toward a given central point and of such configuration as to have snug nested engagement against the curved inner surface of the generally cylindrical metal wall when projected against the metal wall and subjected to pressure during a projection welding operation, said irregularly curved end being of such configuration before welding that the angle of the curving sloped end relative to a given plane passing through the given central point parallel to the longitudinal axis of said generally cylindrical metal wall is substantially greater when viewed from one position as opposed to the angle seen when the stud is viewed from a position generally at right angles to said position, said stud having a recessed portion closed at one end thereof and open at the opposite end, said opposite end being defined by an outer edge with said surface tapered from and irregularly curved about said edge.

13. A metal stud having an end to be welded to a curved surface of a cylindrical bomb casing wall which end has a tapered surface in its entirety irregularly and substantially smoothly curved about a given central point with the irregular substantially smoothly curved tapered surface being such as to more readily afford clearance for the elimination of flash incident to the metal stud being fused to and engulfed in the metal wall.

References Cited in the file of this patent

UNITED STATES PATENTS

| | | |
|---|---|---|
| 1,925,753 | Fitch et al. | Sept. 5, 1933 |
| 2,054,245 | Cummins | Sept. 15, 1936 |
| 2,062,841 | Stefancky | Dec. 1, 1936 |
| 2,213,630 | Gade | Sept. 3, 1940 |
| 2,321,201 | Heilman | June 8, 1943 |
| 2,635,167 | Nelson | Apr. 14, 1953 |